US012559983B2

(12) United States Patent
Zak et al.

(10) Patent No.: US 12,559,983 B2
(45) Date of Patent: Feb. 24, 2026

(54) BOX CONSTRUCTION LOCK

(71) Applicant: FAKRO PP Sp. z o. o., Nowy Sacz (PL)

(72) Inventors: Piotr Zak, Chelmiec (PL); Boguslaw Kasinski, Limanowa (PL)

(73) Assignee: FAKRO PP Sp. z o. o., Nowy Sacz (PL)

( * ) Notice: Subject to any disclaimer, the term of this patent is extended or adjusted under 35 U.S.C. 154(b) by 252 days.

(21) Appl. No.: 18/114,293

(22) Filed: Feb. 27, 2023

(65) Prior Publication Data

US 2023/0323706 A1 Oct. 12, 2023

(30) Foreign Application Priority Data

Mar. 24, 2022 (PL) ...................................... P.440751

(51) Int. Cl.
*E05B 55/00* (2006.01)
*E04F 11/04* (2006.01)
(Continued)

(52) U.S. Cl.
CPC .............. *E05B 55/00* (2013.01); *E04F 11/04* (2013.01); *E05B 15/10* (2013.01); *E05B 17/2088* (2013.01); *E05B 63/0056* (2013.01)

(58) Field of Classification Search
CPC .......... E05B 55/00; E05B 15/10; E05B 15/02; E05B 15/022; E05B 15/104; E05B 15/021; E05B 15/024; E05B 15/0496; E05B 15/04; E05B 17/2088; E05B 63/0056; E05B 63/20; E05B 2015/0413; E05B 63/06; E04F 11/04; E05C 1/14; E05C 1/00; E05C 1/08; E05C 9/20; E04B 9/003; E04B 9/06; E06B 5/04; Y10T 292/68; Y10T 292/705; Y10T 292/707; Y10T 292/096; Y10T 292/0969;
(Continued)

(56) References Cited

U.S. PATENT DOCUMENTS 377,983 A * 2/1888 Bohannan ............... E05B 63/06 292/346
1,245,617 A * 11/1917 Prinzler .............. E05B 15/0245 292/341.18
(Continued)

FOREIGN PATENT DOCUMENTS

CN 111321811 A 6/2020
DE 4440804 A1 * 5/1996 ............. E05B 63/06
(Continued)

OTHER PUBLICATIONS

EP3222801 Espacenet machine translation claims and description (Year: 2024).*

*Primary Examiner* — Steven A Tullia
(74) *Attorney, Agent, or Firm* — Bayramoglu Law Offices LLC

(57) ABSTRACT

A box construction lock with a strike plate assembly is provided. The box construction lock includes a locking mechanism with a locking latch-bolt, located in a lock housing, so that in the lock locked position, the locking latch-bolt is at least partially in the strike plate assembly, and there is adjustment range between the lock housing and the locking mechanism of the lock housing, so that the lock housing has at least two positions relative to the locking mechanism.

20 Claims, 8 Drawing Sheets

(51) Int. Cl.
*E05B 15/10* (2006.01)
*E05B 17/20* (2006.01)
*E05B 63/00* (2006.01)

(58) Field of Classification Search
CPC ......... Y10T 292/0995; Y10T 292/0977; Y10S 292/11; Y10S 292/37
USPC ........................................................... 70/77
See application file for complete search history.

(56) References Cited

U.S. PATENT DOCUMENTS

| | | | | | | |
|---|---|---|---|---|---|---|
| 1,399,897 | A | * | 12/1921 | Singer | E05B 17/2088 | 292/DIG. 55 |
| 1,431,571 | A | * | 10/1922 | Daly | E05B 15/10 | 292/175 |
| 1,458,637 | A | * | 6/1923 | Anderson | E05B 15/0245 | 292/341.18 |
| 1,473,076 | A | * | 11/1923 | Bonilla | E05B 17/2088 | 70/106 |
| 1,570,135 | A | * | 1/1926 | Emmert | E05B 63/20 | 292/334 |
| 1,579,619 | A | * | 4/1926 | Kerby | E05C 19/06 | 292/DIG. 40 |
| 1,593,227 | A | * | 7/1926 | Taylor | E05C 19/007 | 292/169.21 |
| 1,630,093 | A | * | 5/1927 | McPartlin | E05B 65/005 | 292/173 |
| 1,685,508 | A | * | 9/1928 | Stuart | E05C 1/14 | 292/168 |
| 1,696,045 | A | * | 12/1928 | Lach | E05B 55/00 | 70/DIG. 79 |
| 1,833,945 | A | * | 12/1931 | Janonis | E05B 85/22 | 292/170 |
| 1,853,456 | A | * | 4/1932 | Ross | E05B 17/2003 | 292/346 |
| 2,100,591 | A | * | 11/1937 | Haberstump | E05B 83/367 | 292/341.12 |
| 2,469,610 | A | * | 5/1949 | Rocha | E05B 17/2003 | 292/2 |
| 2,709,612 | A | * | 5/1955 | Fox | E05B 17/2088 | 292/DIG. 41 |
| 2,798,754 | A | * | 7/1957 | Russell | E05B 15/0245 | 292/341.18 |
| 3,830,535 | A | * | 8/1974 | Read | E05C 1/14 | 292/336.3 |
| 3,831,988 | A | * | 8/1974 | Stelma | E05F 7/04 | 292/DIG. 41 |
| 3,907,346 | A | * | 9/1975 | Van Klompenburg | E05C 3/30 | 292/DIG. 38 |
| 4,130,310 | A | * | 12/1978 | Kessie | E05B 17/2088 | 292/171 |
| 4,193,619 | A | * | 3/1980 | Jerila | E05C 1/14 | 292/168 |
| 4,312,527 | A | * | 1/1982 | Tannery | E05B 17/2088 | 292/49 |
| 4,379,577 | A | * | 4/1983 | Robertson | E05B 63/128 | 292/341.15 |
| 4,738,054 | A | * | 4/1988 | Muth | E04F 19/08 | 49/386 |
| 5,352,001 | A | * | 10/1994 | Shieh | E05C 1/04 | 292/DIG. 60 |
| 5,595,028 | A | * | 1/1997 | Handzlik | E04B 9/003 | 52/39 |
| 5,941,106 | A | * | 8/1999 | Williamson, Jr. | E05B 47/026 | 292/144 |
| 6,039,364 | A | * | 3/2000 | Rieger | E05B 15/0006 | 292/342 |
| 6,151,848 | A | * | 11/2000 | Hunter | E06B 5/04 | 29/897 |
| 6,578,327 | B1 | * | 6/2003 | Hackbarth | E06B 5/01 | 52/39 |
| 7,234,740 | B2 | * | 6/2007 | Alchin | E05B 15/0245 | 292/341.19 |
| 7,703,815 | B2 | * | 4/2010 | Berkseth | E05B 53/00 | 292/164 |
| 7,954,278 | B2 | * | 6/2011 | Schaaf | E05C 9/22 | 49/396 |
| 9,340,996 | B2 | * | 5/2016 | Nelson | E05B 15/0245 | |
| 10,400,472 | B2 | * | 9/2019 | Schultz | E05B 65/0014 | |
| 10,697,203 | B1 | * | 6/2020 | Gokcebay | E05B 17/10 | |
| 11,293,185 | B1 | * | 4/2022 | Sullivan | E04F 11/1865 | |
| 2017/0314304 | A1 | * | 11/2017 | Nguyen | E05B 63/042 | |

FOREIGN PATENT DOCUMENTS

| | | | | | |
|---|---|---|---|---|---|
| DE | 29714260 | U1 | * | 10/1997 | E05B 15/0245 |
| DE | 19619768 | A1 | * | 11/1997 | E05B 17/2088 |
| DE | 10045744 | A1 | * | 3/2002 | E05B 15/0006 |
| DE | 202011005498 | U1 | * | 2/2013 | E05B 63/0056 |
| DE | 102013104078 | A1 | * | 10/2014 | E05B 63/0056 |
| DE | 102015217998 | A1 | | 3/2017 | |
| EP | 0374351 | A1 | * | 6/1990 | E05B 63/06 |
| EP | 1258582 | A1 | * | 11/2002 | E05B 65/087 |
| EP | 1347127 | A2 | * | 9/2003 | E05B 9/08 |
| EP | 1600584 | A1 | * | 11/2005 | E05B 17/2088 |
| EP | 1717390 | A2 | * | 11/2006 | E05B 15/102 |
| EP | 2169150 | A1 | * | 3/2010 | E05B 15/0245 |
| EP | 2716846 | A2 | * | 4/2014 | E05B 63/202 |
| EP | 3222801 | A1 | * | 9/2017 | E05B 15/10 |
| EP | 3425145 | B1 | * | 1/2021 | E05B 17/2088 |
| FR | 2486578 | A1 | * | 1/1982 | E05B 65/087 |
| GB | 388106 | A | * | 2/1933 | E05B 15/0205 |
| GB | 2106167 | A | | 4/1983 | |
| GB | 2470058 | B | | 8/2014 | |
| GB | 2527908 | A | * | 1/2016 | E05C 3/042 |
| IT | TO20020283 | A1 | * | 9/2003 | E05B 65/1006 |
| JP | 2001115718 | A | * | 4/2001 | E05B 85/045 |
| JP | 2012241314 | A | | 12/2012 | |
| WO | WO-9960234 | A1 | * | 11/1999 | E05B 17/2088 |
| WO | WO-2016202947 | A1 | * | 12/2016 | E05B 63/04 |

* cited by examiner

BOX CONSTRUCTION LOCK

CROSS REFERENCE TO THE RELATED APPLICATIONS

This application is based upon and claims priority to Polish Patent Application No. 440751, filed on Mar. 24, 2022, the entire contents of which are incorporated herein by reference.

TECHNICAL FIELD

The object of the present invention includes a box construction lock, in particular for ceiling mounted attic stairs.

BACKGROUND

A plastic attic stairs lock which uses a coupling and a linkage is known from the range of commercially available products made by OMAN. The attic stairs lock includes a self-latching mechanism, facilitating quick and tight closure of an attic door. The lock includes a locking mechanism inside its housing. The locking mechanism includes a latch-bolt which catches in the strike plate assembly locking the attic stairs hatch in the box frame. The locking latch-bolt is activated by inserting a loft hatch key into the locking mechanism housing.

A loft door lock which includes a control part which uses two crosswise rods on the loft door closing hatch has been disclosed in patent description GB2470058B. The lock's crosswise rods are activated in opposite directions by the lock control part, locking the hatch in a loft door closed position.

Known box construction lock inventions do not have a facility for adjusting box construction elements with respect to one another.

SUMMARY

The lock according to the present invention solves the aforementioned technical problem. The object of the present invention is a box construction lock which includes a locking mechanism with a locking latch-bolt, so that in the lock locked position, the locking latch-bolt is at least partially in the lock's strike plate assembly, whereas in the lock unlocked position, the locking latch-bolt is retracted into the lock housing. The lock's adjustment properties in the front-back direction, inter alia, stem from the adjustment range between the housing and the locking mechanism so that the lock housing includes at least two assembly positions with respect to the locking mechanism. Furthermore inner surfaces of the lock housing and surfaces of the locking mechanism are ribbed to constrain free movement of the lock housing relative to the locking mechanism. The locking mechanism with lock housing is designed for mounting on an articulated element of a box construction. Whereas the strike plate assembly is mounted on an internal box wall of that construction using an articulated mounting base in the form of a foot plate with attachment holes. The mounting base is slide-mounted on the front wall of the strike plate assembly which features elongated holes. The slide-mounted surfaces of the articulated base and strike plate assembly front wall are ribbed to prevent free movement of the mounting base in the strike plate assembly. The lock's locking mechanism is constructed out of a king-pin with an arm and a swivel axle. The king-pin also includes at least one latching arm. The locking mechanism is controlled via a linkage which constitutes a handle for the user. The linkage includes a gripper and is terminated with elastic arms, with the king-pin arm between them. The ends of the elastic arms include chamfered surfaces which act as a lock against the king-pin arm unintentionally detaching from the linkage and which also guide the king-pin arm during insertion between the elastic arms. Inserting the linkage into the lock for the first time or for maintenance purposes, press the lock latch-bolt into the inside of the lock, hold and push the linkage in so that its flexible arms are around the king-pin arm. Then, during ordinary lock use, when it is in a locked position, the latching arm, due to a force acting upon the king-pin arm along the linkage axis, slides the latch-bolt out from the strike plate assembly. The locking mechanism latch-bolt includes a working part in its housing, wherein the working part is constructed out of a resistance face and an end face. The king-pin latching arm is between the resistance face and the end face, so that the latching arm, flush with the resistance face is subjected to a force acting along the linkage axis until it becomes flush with the end face and the lock is in an open position. There is a spring between the latch-bolt and the housing which maintains the latch-bolt in its rest position, which is also the lock's locked position. Both the lock housing and the strike plate assembly have surfaces directing one another into the lock's locked position. The direction surfaces are part of side guide rails and side wall flange, of attached housing and strike plate assembly, whereas the side guide rails and side wall flanges are part of the housing and the strike plate assembly respectively or vice versa. In the lock's locked position, where the strike plate assembly and the lock housing are releasably attached, the side wall flanges are in the side guide rails. In such a position, each flange is flush with an appropriate direction surface of a side guide rail, wherein the side wall flange position relative to side guide rails may be adjusted in the up-down direction depending on the position of the articulated element relative to the box.

Due to the aforementioned box construction lock construction, apart from the obvious locking properties, it also performs the aforementioned adjustment functions which results in an adjustment of the positions of box construction elements relative to one another. The said adjustment entails adjusting the articulated element of a box construction in the front-back direction relative to the plane in which the lock housing is seated on the articulated element and adjustment in the up-down direction relative to that plane. Mounting the lock housing closer or further relative to the locking mechanism will cause the articulated element to be hoisted or distanced within the circumference of the box construction box. The adjustment makes it possible to eliminate assembly gaps which appear between the articulated element and the construction box in the front-back direction. The lock construction makes it possible to also adjust the articulated element of a box construction in the up-down direction relative to the plane in which the lock housing is seated on the articulated element of the box construction. The lock's adjustment properties in the up-down direction relative to the plane on which the lock housing is seated stem from at least two positions of the strike plate assembly on the box and causes the box construction articulated element to be hoisted or lowered relative to the box, ensuring it is tight against the box external surface.

BRIEF DESCRIPTION OF THE DRAWINGS

The illustration depicts the present invention, with given figures showing the following.

DETAILED DESCRIPTION OF THE EMBODIMENTS

Figure 1:
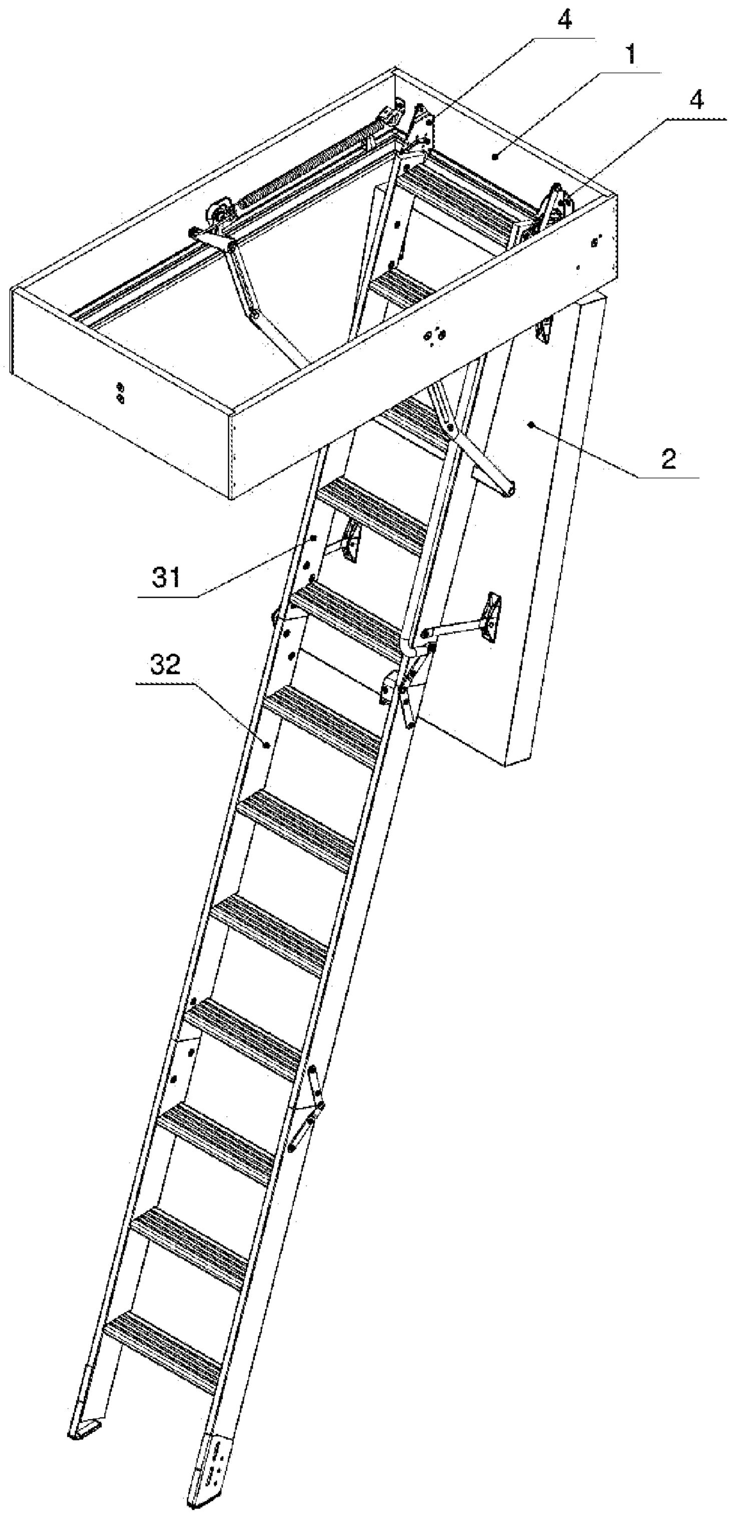
FIG. 1 is a spatial view of attic stairs.
Figure 2:
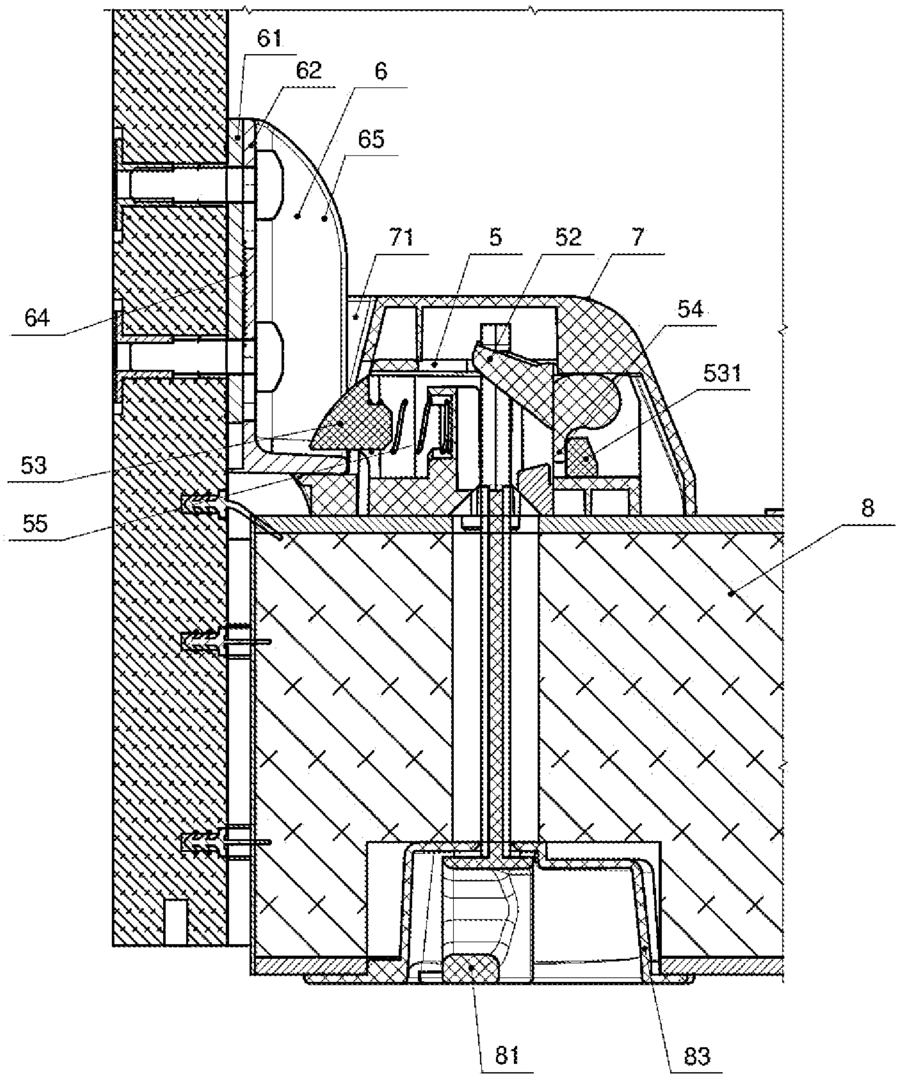
FIG. 2 is a cross-section view of attic stars and lock.
Figure 3A:
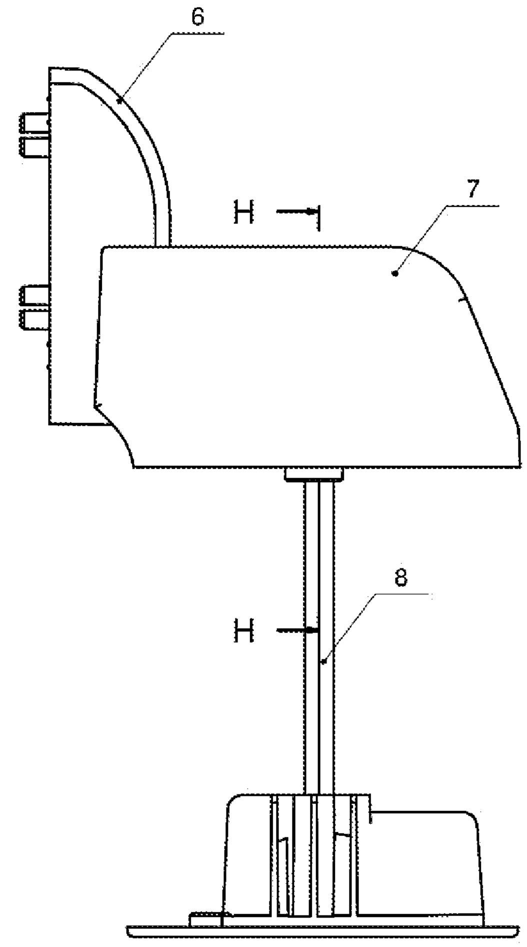
FIG. 3A is a side view of lock and linkage and FIG. 3B shows a cross-section of housing with linkage suspended on king-pin arm.
Figure 3B:
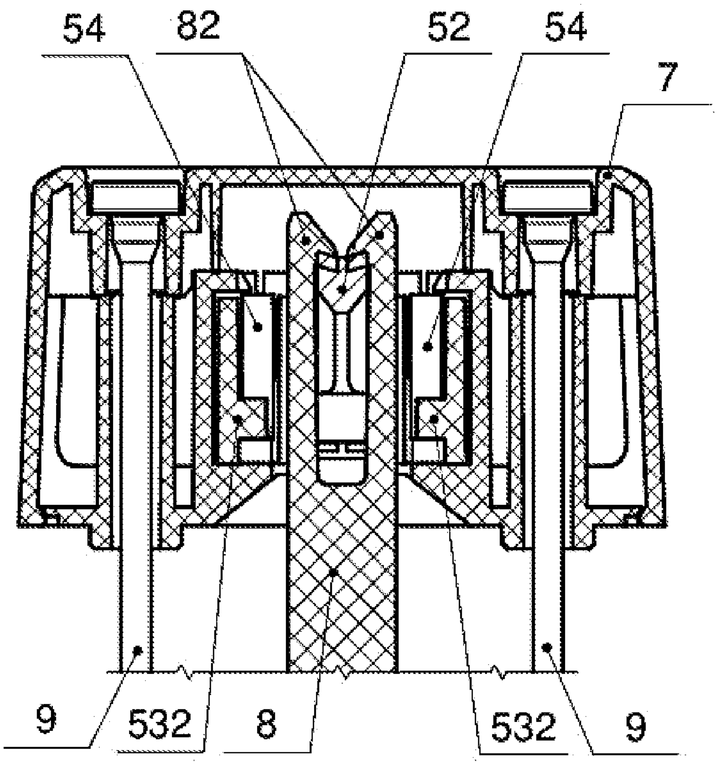
Figure 4:
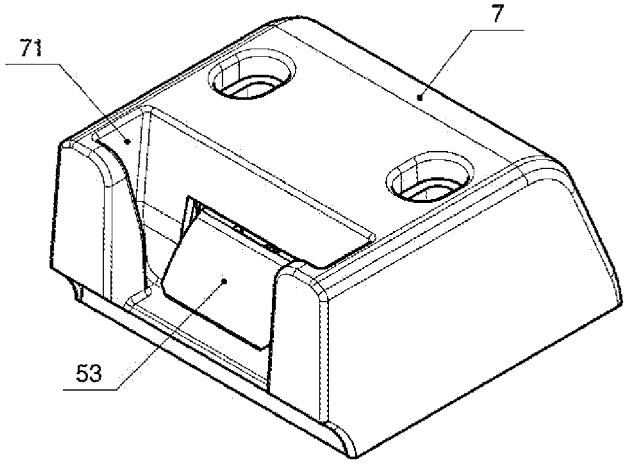
FIG. 4 shows a lock housing with locking latch-bolt.
Figure 5:
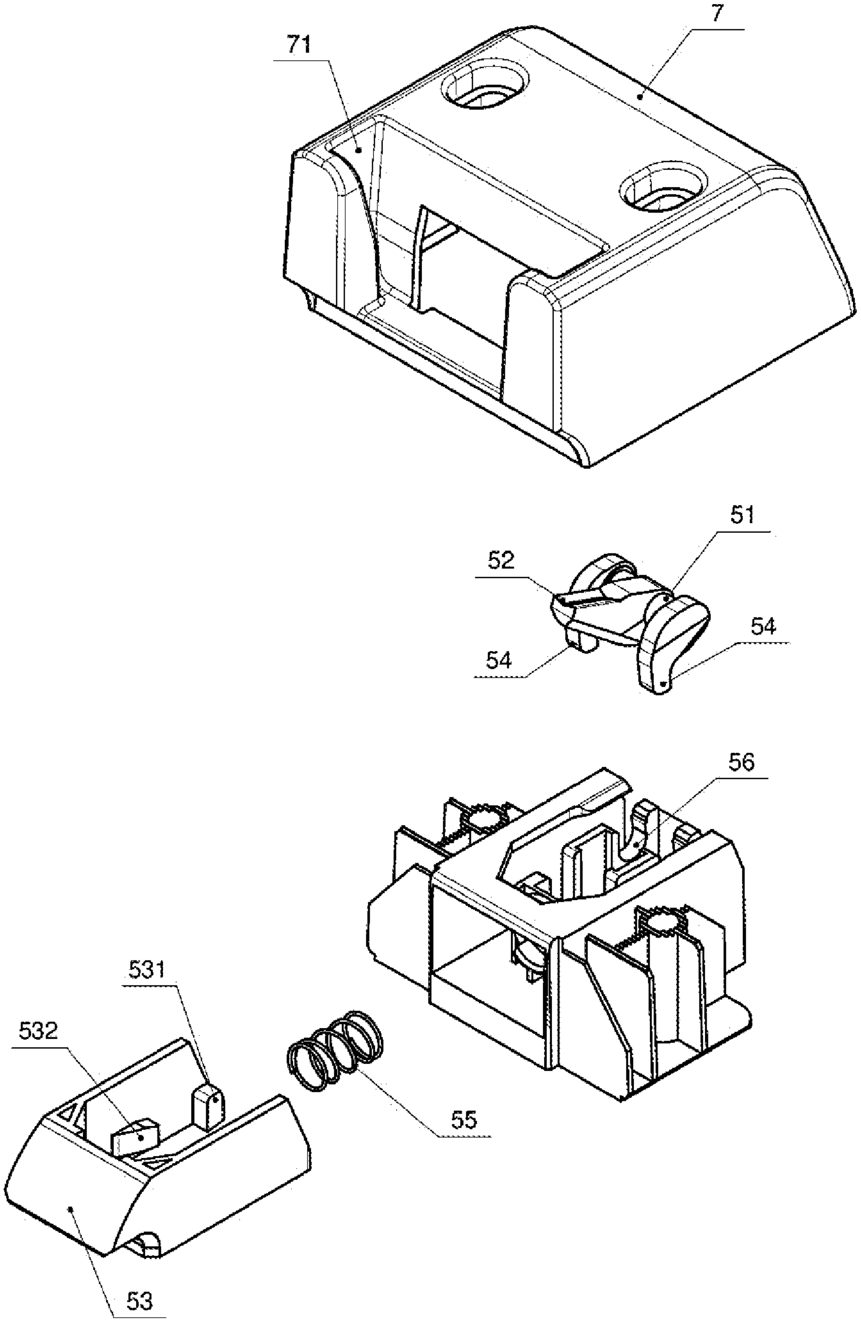
FIG. 5 is an exploded view of lock housing and locking mechanism.
Figure 6:
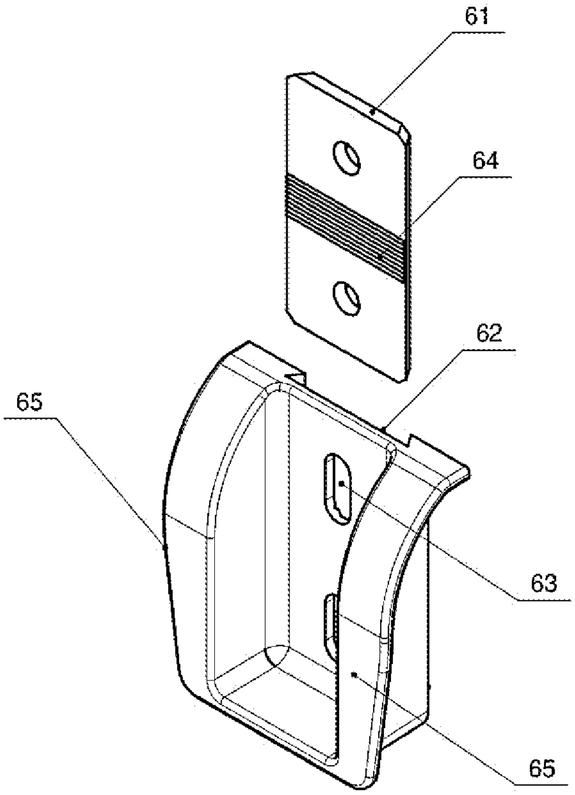
FIG. 6 shows a strike plate assembly.
Figure 7:
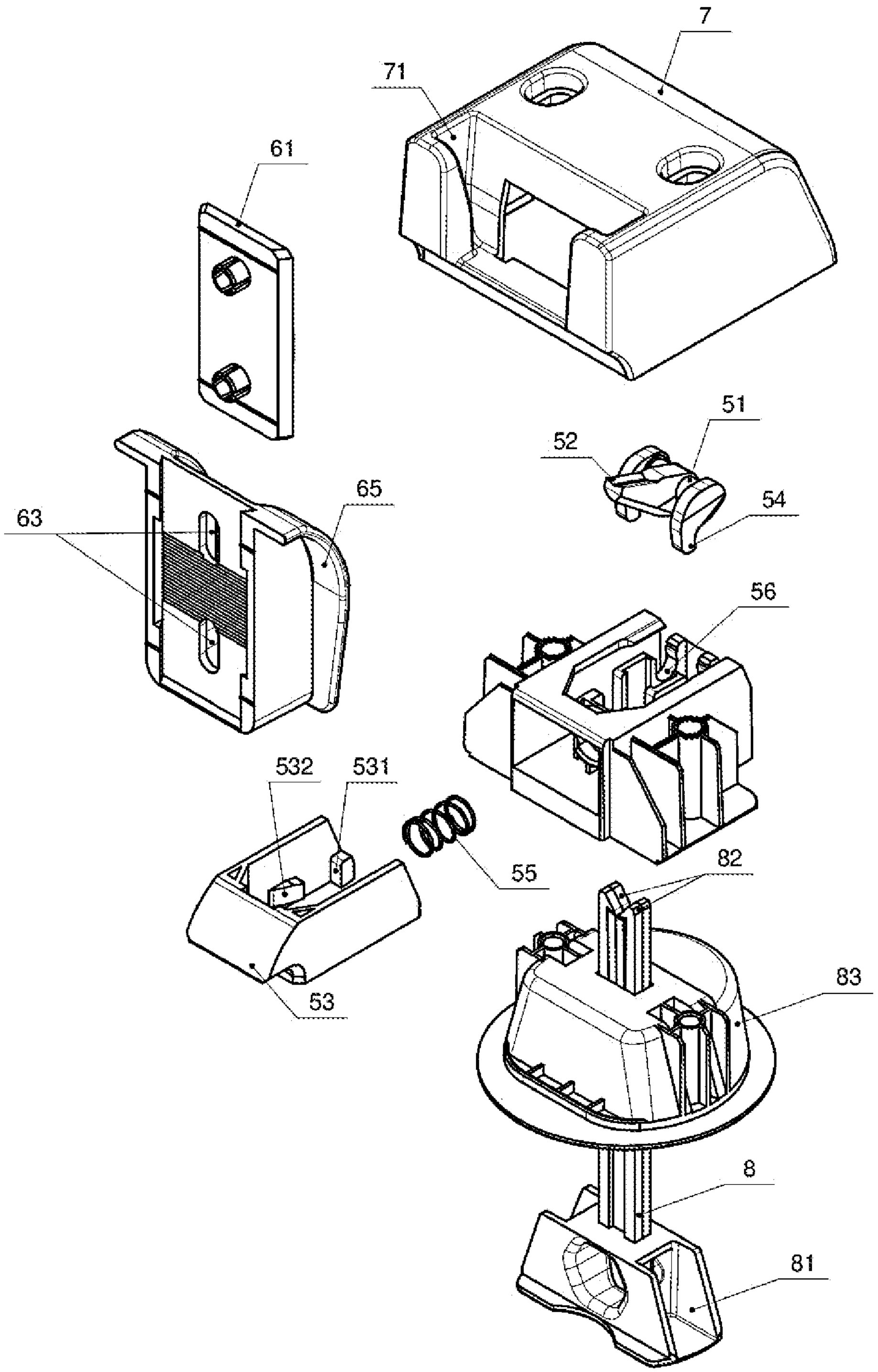
FIG. 7 is an exploded view of lock.

The present invention has been described in detail in an embodiment including box construction attic stairs with a lock according to the present invention. Attic stairs include a box 1 and an articulated element relative to the box in the form of closing hatch 2. At least two ladder segments 31, 32 are seated on closing hatch 2 and box 1. The closing hatch and ladder elements 31, 32 are attached to the box using a pair of hinges 4. In the attic stairs locked position, the ladder elements are at least partially retracted into box 1 and closing hatch 2 closes the box from the bottom. Closing hatch 2 and box 1 feature a lock according to the present invention. Locking mechanism 5 of the locking lock is mounted using attachment means on closing hatch 2 by its edge opposite to the edge with a pair of hinges 4. Whereas the strike plate assembly 6 is on an inner surface of box 1 wall. Strike plate assembly 6 is mounted to box 1 using articulated mounting base 61 slide-mounted on strike plate 6 front wall 62. Mounting base 61 includes at least one elongated hole 63 for an attachment means. Articulated mounting base 61 and strike plate assembly 6 front wall 62 surfaces 64 are ribbed. Furthermore, housing 7 includes side guide rails 71 with surfaces directing strike plate assembly 6 side wall flanges 65 in those side guide rails 71. The width of each side guide rail 71 decreases together with its depth. Whereas locking mechanism 5 is retracted into housing 7 and is constructed out of king-pin 51 with arm 52 seated in pocket 56 and locking latch-bolt 53. The adjustment range between locking mechanism 5 and housing 7 makes it possible to change the position of housing 7 relative to locking mechanism 5 and to mount it in such a position using at least one screw 9 to closing hatch 2. Locking mechanism 5 king-pin arm 52 works with linkage 8 constructed out of gripper 81 and flexible arms 82, wherein gripper 81 in its rest position is in seat 83. King-pin arm 52 is between flexible arms 82 and the said arm 52 transfers kin-pin movement causing it to turn. King pin 51 also includes at least one latching arm 54, which, when the lock is in a locked position, due to a force acting upon the king-pin arm 52 along linkage 8 axis, slides locking latch-bolt 53 out from strike plate assembly 6. To that end locking latch-bolt 53 of the locking mechanism includes a working part located in housing 7, wherein the working part includes resistance face 531 which king-pin latching arm 54 is flush with when the lock is changing to its open position. End face 532 is also located in the working part. Its skewed surfaces are flush with king-pin arm 52 side surfaces which prevents the king-pin from returning upwards, in the lock's maintenance position. Spring 55 is located between locking latch-bolt 53 and lock 7 housing which maintains locking latch-bolt 53 in its rest position, which is also the lock's locked position. Linkage 8 held by gripper 81 is inserted by the user into the locking mechanism through the housing, and its flexible arms 82 include chamfered surfaces facilitating insertion of king-pin arm 52 between them and locking them against uncontrolled detachment.

In order to lock closing hatch 2 within the circumference of box 1 using the lock, the user inserts locking hatch 2 into the circumference of box 1. If there are gaps between box 1 edges and closing hatch 2 edges, these should be eliminated by changing the position of lock housing 7. Once strike plate assembly flanges 65 have entered housing side guide rails 71, closing hatch 2 will move away or move closer to box 2 edges depending on user requirements. Whereas if, once box 1 is closed, closing hatch 2 is not tight against box 1 external edge, strike plate assembly 6 mounted to box 1 wall using mounting base 61 is let down or hoisted. This adjustment makes it possible to raise or lower closing hatch 2 relative to box 1 and it is made possible by the build of housing 7 and strike plate assembly 6.

What is claimed is:

1. A box construction lock, comprising an articulated element and a box, wherein the box construction lock further comprises a strike plate assembly, and a locking mechanism with a locking latch-bolt, wherein the locking mechanism is located in a lock housing, wherein in a lock locked position, the locking latch-bolt is at least partially in a strike plate assembly, wherein an adjustment range is formed between the lock housing and the locking mechanism of the lock housing, wherein the lock housing comprises at least two positions relative to the locking mechanism for adjustment of positions of the articulated element relative to the box, wherein the locking mechanism comprises a king-pin having an arm and a swivel axle, wherein the arm is positioned between flexible arms, wherein each flexible arm of the flexible arms comprises chamfered surfaces formed to facilitate smooth and guided insertion of the arm between the flexible arms, and wherein the chamfered surfaces are structured to progressively deflect the flexible arms upon insertion of the arm to securely capture and lock the arm in place and prevent uncontrolled or inadvertent detachment of the arm.

2. The box construction lock according to claim 1, wherein in the lock locked position, direction surfaces of the strike plate assembly and the lock housing are flush with each other.

3. The box construction lock according to claim 2, wherein direction surfaces of the lock housing and the strike plate assembly are part of side guide rails and flange of side walls of elements attached to one another, and in the lock locked position, the flanges of the side walls are located in the side guide rails, wherein each of the flanges is flush with a direction surface of an appropriate side guide rail, and a width of each of the side guide rails decreases together with a depth of each of the side guide rails.

4. The box construction lock according to claim 2, wherein inner surfaces of the lock housing and surfaces of the locking mechanism are ribbed to constrain a free movement of the lock housing relative to the locking mechanism, wherein the surfaces of the locking mechanism are in contact with the inner surfaces of the lock housing.

5. The box construction lock according to claim 2, wherein the strike plate assembly comprises an articulated mounting base with attachment holes, the articulated mounting base is slide-mounted on a front wall of the strike plate assembly with elongated holes.

6. The box construction lock according to claim 2, wherein the locking mechanism is constructed out of a king-pin with an arm and a swivel axle, wherein the king-pin comprises at least one latching arm, wherein when the box construction lock is in a locked position, due to a force acting upon the king-pin arm along a linkage axis, the at least one latching arm slides the locking latch-bolt out from the strike plate assembly.

7. The box construction lock according to claim 1, wherein direction surfaces of the lock housing and the strike plate assembly are part of side guide rails and flange of side walls of elements attached to one another, and in the lock locked position, the flanges of the side walls are located in the side guide rails, wherein each of the flanges is flush with a direction surface of an appropriate side guide rail, and a width of each of the side guide rails decreases together with a depth of each of the side guide rails.

8. The box construction lock according to claim 7, wherein inner surfaces of the lock housing and surfaces of the locking mechanism are ribbed to constrain a free movement of the lock housing relative to the locking mechanism, wherein the surfaces of the locking mechanism are in contact with the inner surfaces of the lock housing.

9. The box construction lock according to claim 7, wherein the strike plate assembly comprises an articulated mounting base with attachment holes, the articulated mounting base is slide-mounted on a front wall of the strike plate assembly with elongated holes.

10. The box construction lock according to claim 7, wherein the locking mechanism is constructed out of a king-pin with an arm and a swivel axle, wherein the king-pin comprises at least one latching arm, wherein when the box construction lock is in a locked position, due to a force acting upon the king-pin arm along a linkage axis, the at least one latching arm slides the locking latch-bolt out from the strike plate assembly.

11. The box construction lock according to claim 1, wherein inner surfaces of the lock housing and surfaces of the locking mechanism are ribbed to constrain a free movement of the lock housing relative to the locking mechanism, wherein the surfaces of the locking mechanism are in contact with the inner surfaces of the lock housing.

12. The box construction lock according to claim 11, wherein the strike plate assembly comprises an articulated mounting base with attachment holes, wherein the articulated mounting base is slide-mounted on a front wall of the strike plate assembly with elongated holes.

13. The box construction lock according to claim 1, wherein the strike plate assembly comprises an articulated mounting base with attachment holes, wherein the articulated mounting base is slide-mounted on a front wall of the strike plate assembly with elongated holes.

14. The box construction lock according to claim 13, wherein the articulated mounting base and surfaces of the front wall of the strike plate assembly are ribbed.

15. The box construction lock according to claim 14, wherein a spring is located between the locking latch-bolt and the lock housing, wherein the spring maintains the locking latch-bolt in a rest position of the locking latch-bolt, wherein the rest position is also the lock locked position.

16. The box construction lock according to claim 1, wherein the king-pin further comprises at least one latching arm, wherein when the box construction lock is in a locked position, due to a force acting upon the arm along a linkage axis, the at least one latching arm slides the locking latch-bolt out from the strike plate assembly.

17. The box construction lock according to claim 16, wherein the locking latch-bolt of the locking mechanism comprises a working part located in the lock housing, wherein the working part comprises a resistance face, wherein the at least one latching arm of the king-pin is flush with the resistance face.

18. The box construction lock according to claim 1, wherein a linkage comprises a gripper, and the linkage terminates with elastic arms with a king-pin arm, wherein the king-pin arm is configured between the elastic arms.

19. The box construction lock according to claim 18, wherein an end of each of the elastic arms comprises a chamfered surface, wherein the chamfered surface acts as a lock against a king-pin arm unintentionally detaching from the linkage, and the chamfered surface further guides the king-pin arm during an insertion between the elastic arms.

20. The box construction lock according to claim 1, wherein the box construction lock takes up a maintenance position where the locking latch-bolt is inserted manually and held in the lock housing, and a king-pin is fixed in a position where an empty space for the elastic arms is formed between a king-pin arm and the lock housing.

* * * * *